United States Patent
Shimazaki et al.

(10) Patent No.: US 11,403,501 B2
(45) Date of Patent: Aug. 2, 2022

(54) PRINTING APPARATUS AND CONTROL METHOD

(71) Applicant: CANON KABUSHIKI KAISHA, Tokyo (JP)

(72) Inventors: Arashi Shimazaki, Atsugi (JP); Kazuhisa Fujino, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/834,126

(22) Filed: Mar. 30, 2020

(65) Prior Publication Data

US 2020/0320358 A1 Oct. 8, 2020

(30) Foreign Application Priority Data

Apr. 5, 2019 (JP) .............................. JP2019-073083

(51) Int. Cl.
*B41J 11/00* (2006.01)
*B41J 13/00* (2006.01)
*G06K 15/16* (2006.01)

(52) U.S. Cl.
CPC ............. *G06K 15/16* (2013.01); *B41J 11/003* (2013.01); *B41J 11/007* (2013.01); *B41J 11/0095* (2013.01); *B41J 13/0018* (2013.01); *B41J 13/0054* (2013.01)

(58) Field of Classification Search
CPC ..... G06K 15/16; B41J 11/003; B41J 13/0018; B41J 13/0054; B41J 11/007; B41J 11/0095
See application file for complete search history.

(56) References Cited

U.S. PATENT DOCUMENTS

| | | | | |
|---|---|---|---|---|
| 2008/0237967 A1* | 10/2008 | Suzuki | ................... | B65H 5/062 271/10.16 |
| 2013/0009355 A1* | 1/2013 | Yasuda | ................... | B65H 1/14 271/127 |
| 2013/0195531 A1* | 8/2013 | Nakamura | ......... | G03G 15/6502 399/388 |
| 2016/0152425 A1* | 6/2016 | Inoue | .................... | B41J 13/076 271/10.03 |

FOREIGN PATENT DOCUMENTS

JP        6115339 B2     4/2017

OTHER PUBLICATIONS

U.S. Appl. No. 16/834,143, Kazuhisa Fujino, filed Mar. 30, 2020.

* cited by examiner

*Primary Examiner* — Yaovi M Ameh
(74) *Attorney, Agent, or Firm* — Venable LLP

(57) ABSTRACT

In a printing apparatus, a control unit stops paper feeding driven by a driving unit for driving a paper feeding roller in response to a timing at which a printing medium reaches a conveying roller, if the printing medium has a first size, and stops paper feeding driven by the driving unit before a detection unit located upstream of the conveying roller detects the printing medium if the printing medium has a second size smaller than the first size.

23 Claims, 8 Drawing Sheets

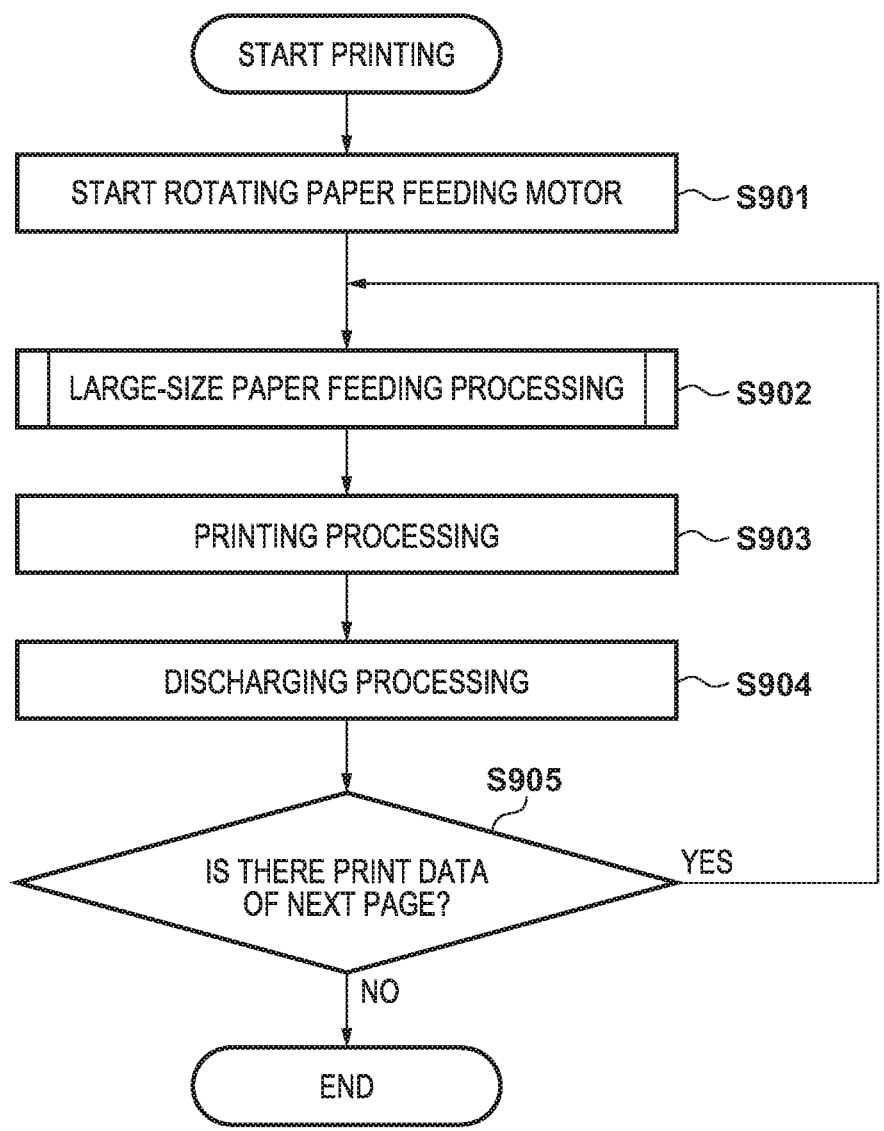

PRINTING APPARATUS AND CONTROL METHOD

BACKGROUND OF THE INVENTION

Field of the Invention

The present invention relates to a printing apparatus that prints on a conveyed printing medium and a control method.

Description of the Related Art

A printing apparatus can increase the printing speed by simultaneously performing a printing operation on a preceding paper sheet and a paper feeding operation of a succeeding paper sheet. In addition, arranging a plurality of motors including a conveying motor and a paper feeding motor can further increase the printing speed by changing the driving amount by which a preceding paper sheet is conveyed by a printing operation and the driving amount by which a succeeding paper sheet is conveyed by a paper feeding operation.

Japanese Patent Laid-Open No. 6115339 discloses a printing apparatus including a paper feeding motor and a conveying motor. A paper feeding roller for picking up a paper sheet and intermediate rollers for feeding a printing medium are connected to the paper feeding motor. Changing the rotating direction of the paper feeding motor makes it possible to perform two control operations including a control operation of "picking up a printing medium from the accommodation portion, transferring the printing medium to the conveying path, and continuing conveyance" and a control operation of "performing only conveyance of the printing medium".

However, when the rotating direction of the paper feeding motor is changed, a delay is caused by backlash between the start of changing the rotation of the motor and the start of driving the roller. This may lead to a decrease in conveying speed depending on the size of a printing medium when changing the rotating direction.

SUMMARY OF THE INVENTION

The present invention provides a printing apparatus and a control method which suppress a deterioration in the conveying accuracy of printing media.

The present invention in one aspect provides a printing apparatus comprising: a first driving unit configured to drive a paper feeding roller that feeds a printing medium; a second driving unit configured to drive a conveying roller that conveys the printing medium fed by the paper feeding roller; a printing unit configured to print on the printing medium conveyed by the conveying roller; a control unit configured to control driving of the first driving unit and the second driving unit; and a detection unit located upstream of the conveying roller on a conveying path and configured to detect the printing medium, wherein the control unit stops paper feeding driven by the first driving unit in response to a timing at which the printing medium reaches the conveying roller, if the printing medium has a first size, and stops paper feeding driven by the first driving unit before the detection unit detects the printing medium if the printing medium has a second size smaller than the first size.

According to the present invention, it is possible to suppress a deterioration in the conveying accuracy of printing media.

Further features of the present invention will become apparent from the following description of exemplary embodiments with reference to the attached drawings.

BRIEF DESCRIPTION OF THE DRAWINGS

FIG. 9 is a flowchart showing the printing processing performed by the printing apparatus.

DESCRIPTION OF THE EMBODIMENTS

Figure 1:
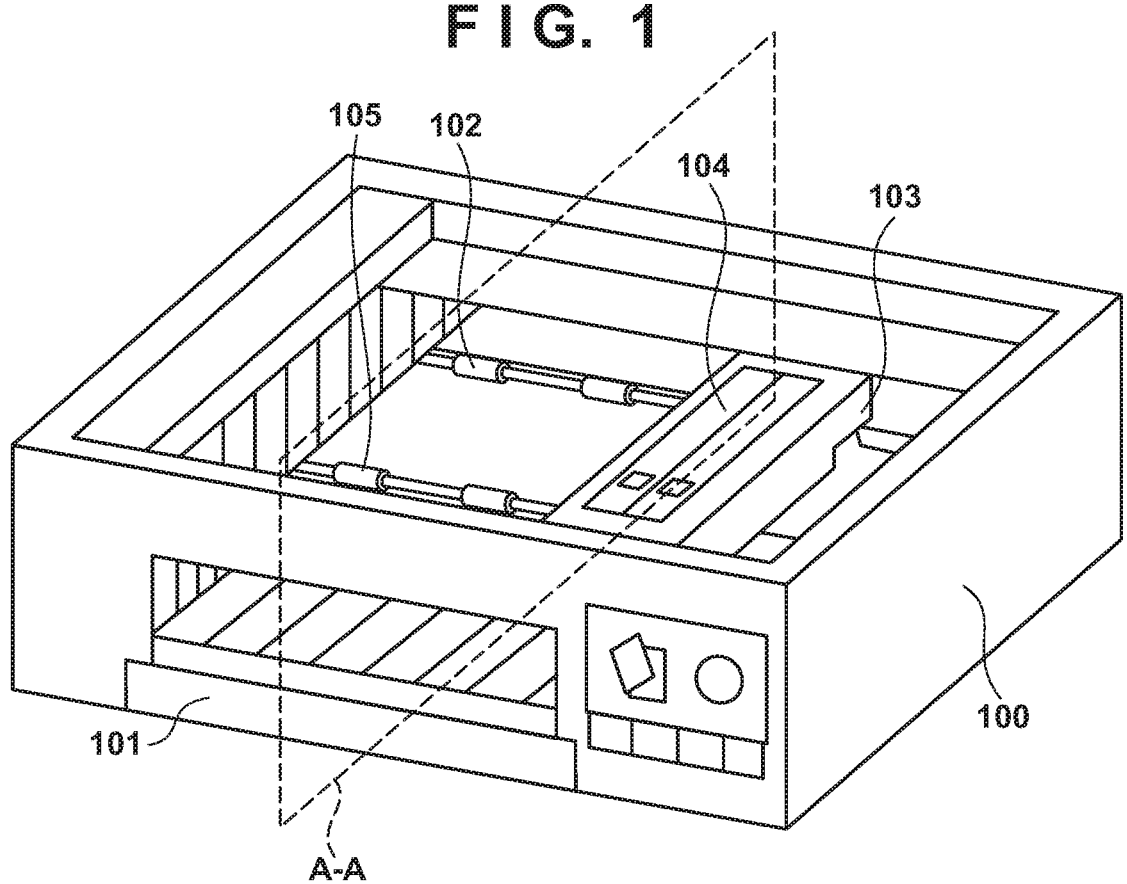
FIG. 1 is a schematic perspective view showing an outline of an inkjet printing apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Figure 2:
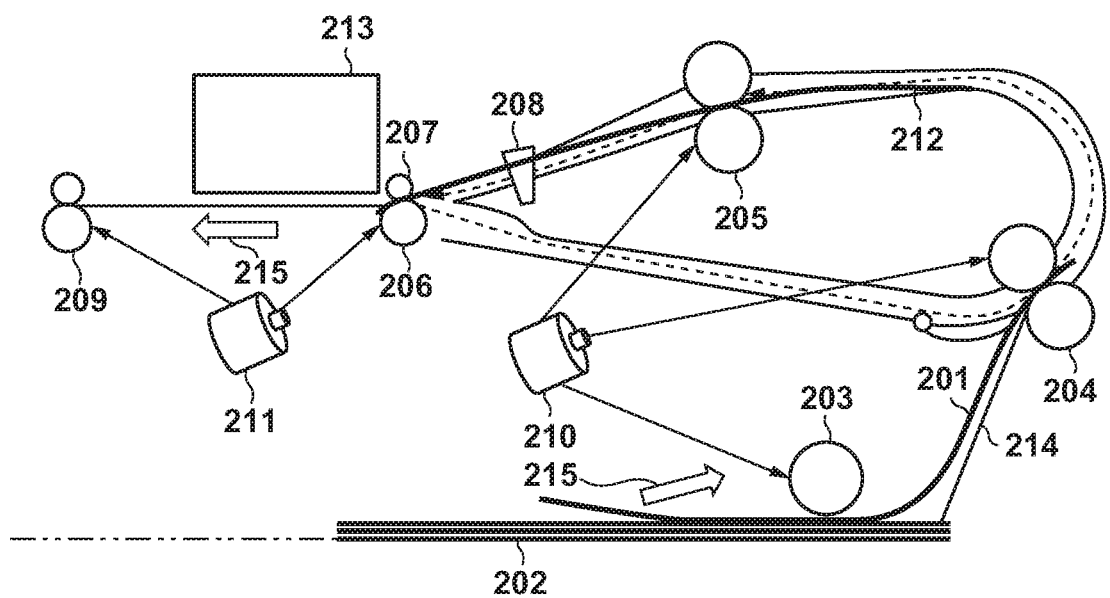
FIG. 2 is a view schematically showing a section of the printing apparatus.

FIG. 1 is a schematic perspective view showing an outline of an inkjet printing apparatus (to be referred to as a printing apparatus) 100 according to this embodiment. FIG. 2 is a view showing the printing apparatus 100 seen from section A-A in the conveying direction in FIG. 1. A conveying device (conveying unit) 102 includes a conveying roller 206 and a pinch roller 207 (to be described later). A printing unit 103 includes a carriage 213 (see FIG. 2) and an ink discharge portion 104 (see FIG. 1). The printing apparatus 100 stacks printing media such as printing sheets on a paper feeding tray 101 and feeds printing media one by one to the conveying device 102. After a paper feeding operation, the conveying device 102 conveys the printing medium onto the conveying path. The printing unit 103 reciprocally moves the carriage 213 equipped with a printhead along a scanning direction perpendicular to the conveying direction, with respect to the printing medium during conveyance, and causes the ink discharge portion 104 to discharge ink droplets onto the printing medium, thereby printing a one-band image. Repeating this printing operation and conveying operation will print an image entirely on the printing medium. The printing medium on which the printing is performed is discharged out of the printing apparatus 100 by being caught between discharging rollers 105 and spurs.

FIG. 2 schematically shows a section of the printing apparatus 100. Referring to FIG. 2, a paper feeding motor 210 drives a paper feeding roller 203, first intermediate rollers 204, and second intermediate rollers 205. A conveying motor 211 drives the conveying roller 206 and a discharging roller 209. When the paper feeding motor 210 is rotated clockwise, the paper feeding roller 203 rotates in a direction to pick up a printing medium 201, and the first intermediate rollers 204 and the second intermediate rollers 205 convey the printing medium 201 along a conveying direction 215. In contrast, when the paper feeding motor 210 is rotated counterclockwise, the paper feeding roller 203 rotates in a direction to stop picking up the printing medium 201. In this case, the first intermediate rollers 204 and the second intermediate rollers 205 feed the printing medium 201 along the conveying direction 215 as in the case in which the paper feeding motor 210 is rotated clockwise.

The printing apparatus 100 controls the paper feeding motor 210 to drive the paper feeding roller 203 and feed the printing media 201 one by one from a paper feeding tray 202 onto the conveying path. The printing medium 201 ascends along a slope 214 of the cassette and reaches the first intermediate rollers 204. The paper feeding motor 210 also rotates the first intermediate rollers 204 and the second intermediate rollers 205 in a direction to convey the printing medium 201 in the conveying direction 215. Note that in this embodiment, the paper feeding motor 210 can rotate three rollers. However, such rollers may be installed as many as the number set in accordance with the length of the conveying path or the length of a printing medium.

A paper detection sensor 208 detects the printing medium 201 fed by the paper feeding roller 203 and conveyed onto the conveying path. After the detection of the printing medium 201, the leading end position of the printing medium 201 is calculated based on the driving amounts of the paper feeding motor 210 and the conveying motor 211. The conveying motor 211 rotates the conveying roller 206 and the discharging roller 209 to move the printing medium 201 forward in the conveying direction 215. In this case, the pinch roller 207 holds the printing medium 201. When the printing medium 201 is conveyed to a printing position below the carriage 213 equipped with the printhead, print processing starts. As shown in FIG. 2, the paper feeding roller 203, the first intermediate rollers 204, the second intermediate rollers 205, the conveying roller 206, and the discharging roller 209 are sequentially positioned in this order toward the downstream side from the portion where the paper feeding roller 203 starts paper feeding.

Changing the rotating direction of the paper feeding motor 210 can stop paper feeding by the paper feeding roller 203. The paper feeding operation of the paper feeding roller 203 may be stopped by stopping the paper feeding motor 210 as well as changing the rotating direction of the paper feeding motor 210. When the rotating direction of the paper feeding roller 203 changes, the intermediate rollers 204 and 205, which are driven together with the paper feeding motor 210, instantly stop. As a result, a delay occurs in the rotation of the intermediate rollers 204 and 205.

Figure 3:
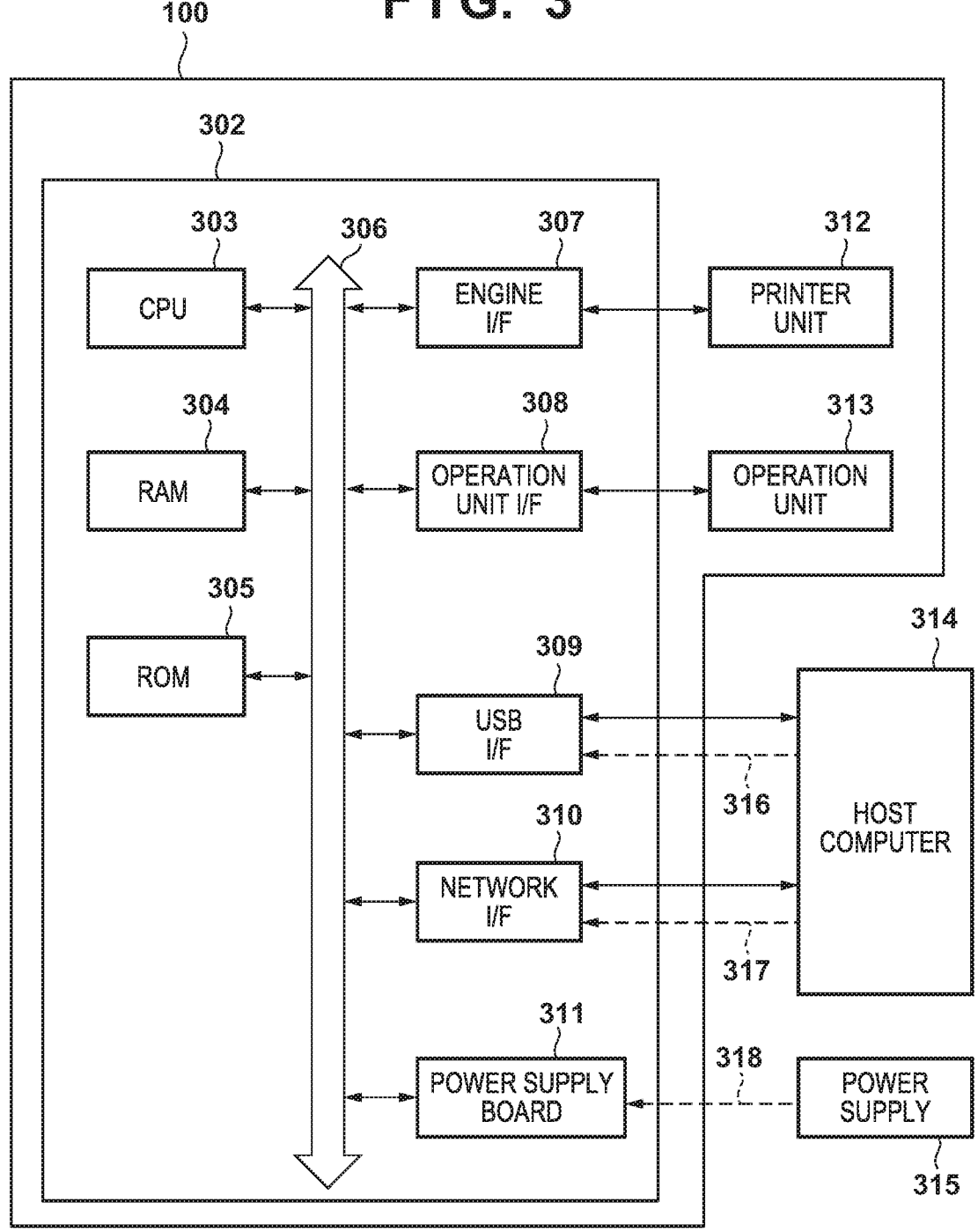
FIG. 3 is a block diagram showing the hardware arrangement of the printing apparatus.

FIG. 3 is a block diagram showing the hardware arrangement of the printing apparatus 100. In the printing apparatus 100, a control unit 302 is formed as, for example, a controller board, and comprehensively controls the printing apparatus 100. A CPU 303 controls data transfer between the respective blocks in the control unit 302, and performs various types of control such as power ON control and printing control by executing, for example, control programs recorded in a ROM 305 upon deploying the programs in a RAM 304. The RAM 304 is the main memory of the CPU 303 and is used as a temporary storage area for the expansion of various types of programs stored in the work area or the ROM 305. The ROM 305 is a read only memory and stores, for example, image data, various types of programs, and various types of setting information. As the ROM 305, for example, a flash storage is used. In addition, as a storage unit such as the ROM 305, an auxiliary storage device such as a hard disk may be used.

In this embodiment, one CPU 303 executes each process shown in the flowcharts (to be described later) by using one RAM 304. However, the present invention may be implemented in other forms. For example, each process shown in the flowcharts (to be described later) may be executed by making a plurality of CPUs and pluralities of RAMs, ROMs, and storages operate in cooperation with each other. In addition, each process shown in the flowcharts (to be described later) may be partially executed by using a hardware circuit.

An engine interface (to be referred to as an I/F hereinafter) 307 connects a printer unit 312 to the control unit 302. Image data to be printed by the printer unit 312 is transferred from the control unit 302 via the engine I/F 307 and printed on the printing medium 201 by the printer unit 312. An operation unit I/F 308 is connected to an operation unit 313 and the control unit 302. The operation unit 313 includes a liquid crystal display unit having a touch panel function and operation keys and functions as an accepting unit that accepts user instructions. A USB I/F 309 is an interface complying with USB standards. A network I/F 310 has an arrangement corresponding to a network medium such as a wired or wireless medium, and controls, for example, communication with a host computer 314 connected to the printing apparatus 100. A power supply board 311 supplies power, supplied from a power supply 315 via a power supply cable 318, to the printing apparatus 100 upon voltage transformation. The power supply board 311 may include a rechargeable battery that can be recharged with power. The printing apparatus 100 may include blocks other than those shown in FIG. 3 as appropriate. For example, the printing apparatus 100 may include a scanner unit that optically reads the document placed on a document table.

Figure 4:
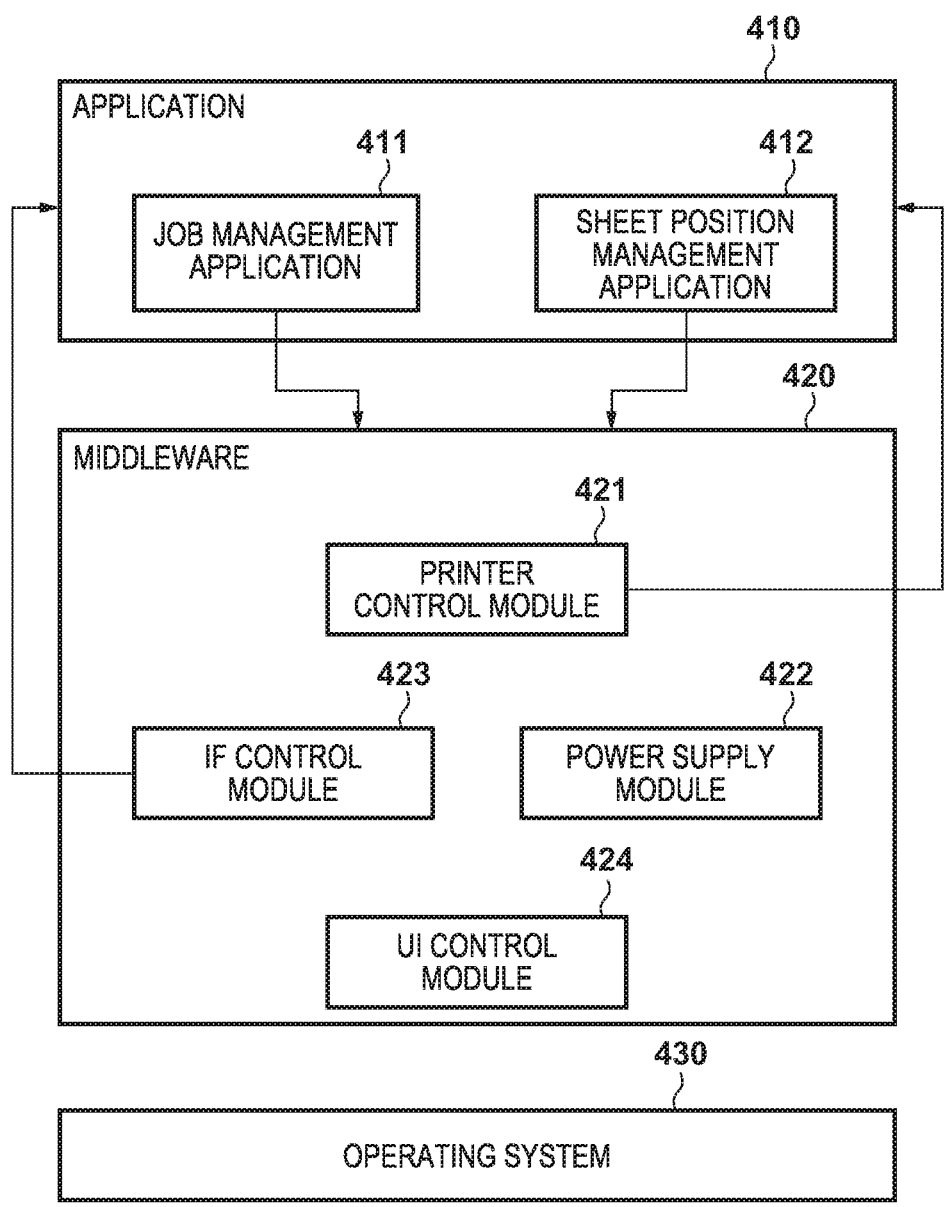
FIG. 4 is a block diagram showing the software arrangement of control programs.

FIG. 4 shows the software arrangement of control programs for controlling the respective hardware modules expanded in the RAM 304. The control programs include applications 410 that manage applications, middleware 420 for controlling the apparatus via various types of I/Fs, and an operating system 430 that manages overall control. The operating system 430 provides basic functions for allowing the control unit 302 to execute control programs.

The middleware 420 includes a software group that controls I/F with the printer unit 312 and each physical device. The middleware 420 includes, for example, a printer control module 421, a power supply module 422, an I/F control module 423, and a UI control module 424. The printer control module 421 is a module that controls the engine I/F 307. The power supply module 422 is a module that controls the power supply board 311. The I/F control module 423 is a module that controls the USB I/F 309 as a device used for communication with the host computer 314 and the network I/F 310. The UI control module 424 is a module that controls the operation unit I/F 308.

The applications 410 include, for example, a job management application 411 and a paper sheet position management application 412. The applications 410 implement functions such as a recording (printing) function with which the printing apparatus 100 can provide to the user by causing each device to operate via corresponding middleware.

For example, upon detecting that the user has executed printing via the operation unit 313 and the operation unit I/F 308, the UI control module 424 of the middleware 420 notifies the applications 410 of the corresponding information. The job management application 411 controls the printer unit 312 via the engine I/F 307 to execute a printing operation by using the printer control module 421 of the middleware 420.

The paper sheet position management application 412 notifies the printer control module 421 of the middleware 420 of the media information obtained from the job management application 411. The printer control module 421 controls the printer unit 312 in accordance with the media information, thereby obtaining position information of the printing medium 201. If there is no printing medium 201, the paper sheet position management application 412 controls the UI control module 424 of the middleware 420 to prompt the user to set the printing medium 201 again. Upon obtaining the physical position information of the printing medium 201, the UI control module 424 notifies the job management application 411 of the correct position of the printing medium 201. The job management application 411 generates printing data based on the corrected position of the printing medium 201, and controls the printer unit 312 by using the printer control module 421, thereby performing a printing operation.

Figure 5:
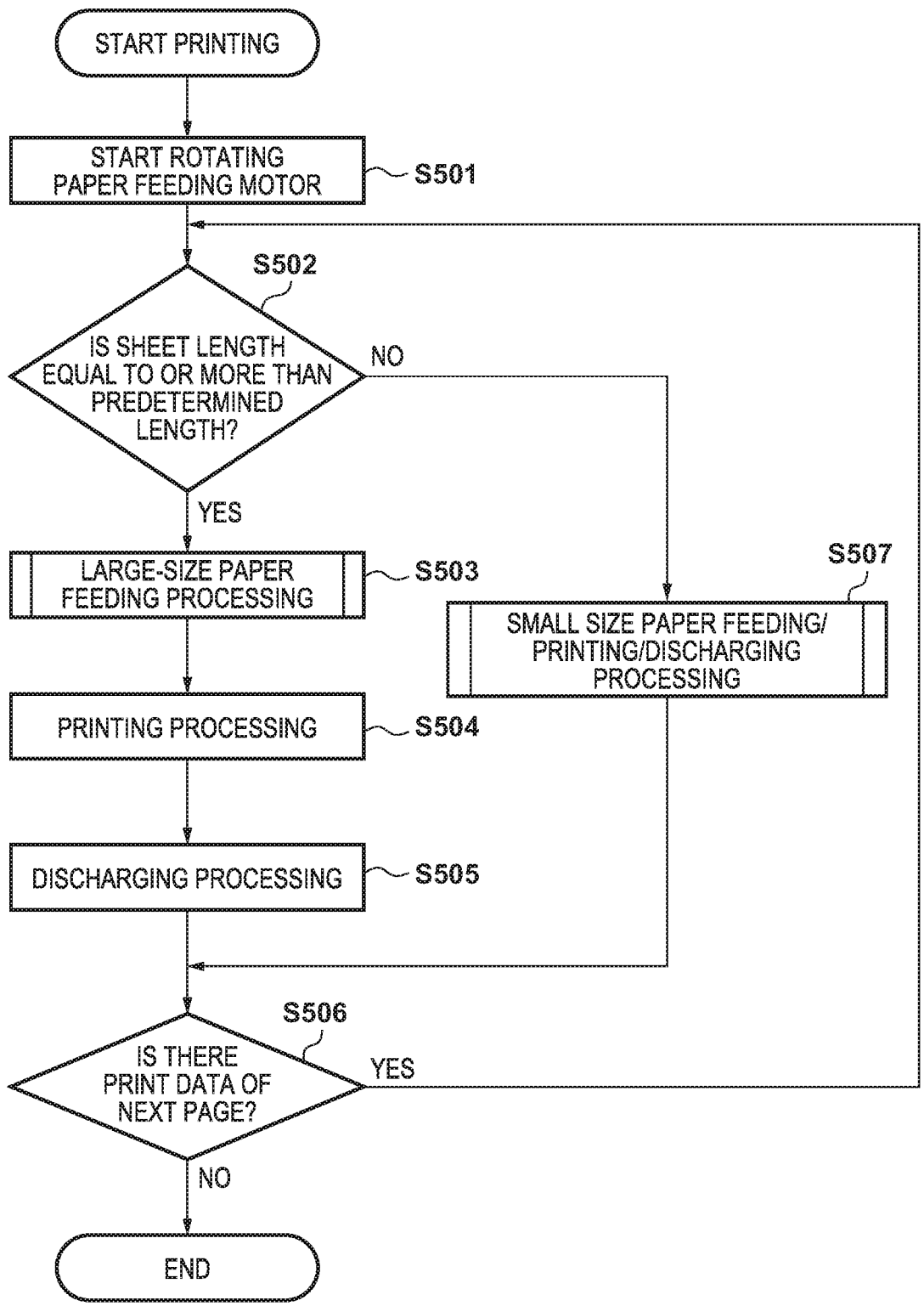
FIG. 5 is a flowchart showing the printing processing performed by the printing apparatus.

The printing operation performed by the printing apparatus 100 with respect to a plurality of printing media will be described next. FIG. 5 is a flowchart showing the printing processing performed by the printing apparatus 100. For example, the CPU 303 implements the processing in FIG. 5 by reading out programs stored in the ROM 305 into the RAM 304 and then executing the programs. The printing apparatus 100 receives a printing operation instruction (job) from the host computer 314 via the USB I/F 309 or the network I/F 310. The printer control module 421 then controls the printer unit 312 via the engine I/F 307 to start the processing in FIG. 5. Although this embodiment exemplifies a case in which a job is received from the host computer 314, the printing apparatus 100 may generate a job.

In step S501, upon receiving an instruction to execute a print job, the CPU 303 causes the paper feeding motor 210 to start rotating to feed the printing medium 201. At this time, the paper feeding motor 210 is controlled to rotate in a direction corresponding to the conveying direction 215 of the printing medium 201.

In step S502, immediately after the start of paper feeding processing, the CPU 303 determines, based on information held by the job management application 411, whether the length of a paper sheet used for the print job is equal to or more than a predetermined length. This determination is performed for the following reason.

If the paper sheet length is equal to or more than a predetermined size (for example, A4), the leading end of the paper sheet is nipped between the conveying roller 206 and the pinch roller 207 at a printing start position, and the paper sheet length is longer than the length of the conveying path. In this case, no succeeding paper sheet subjected to printing is fed. In contrast, if the leading end of a paper sheet is less than a predetermined size (for example, A5), when the leading end of the paper sheet reaches the printing start position, the length of the conveying path is longer than the paper sheet length. Assume that a paper sheet subjected next to printing has already reached the printing start position during printing on a printing medium. In this case, if the trailing end of the printing medium is located on the downstream side of the first intermediate rollers 204, the paper feeding roller 203 sometimes feeds the next paper sheet. If there is no need to print on this page, the paper sheet becomes unnecessary. For this reason, paper feeding, printing, and discharging processing are changed in accordance with the paper sheet length (paper sheet size). If the CPU 303 determines in step S502 that the paper sheet length corresponding to a print job is equal to or more than a predetermined length, the process advances to step S503. If the CPU 303 determines that the paper sheet length corresponding to a print job is less than the predetermined length, the process advances to step S507. Steps S503 and S507 will be respectively described later with reference to FIGS. 6 and 7.

In step S504, when the printing medium 201 reaches the printing start position, the CPU 303 controls the conveying motor 211 to rotate the conveying roller 206 and the discharging roller 209 and also scan the carriage 213, thereby performing printing. In step S505, after the printing processing, the CPU 303 controls the conveying motor 211 to rotate the conveying roller 206 and the discharging roller 209, thereby discharging the printing medium 201. In this case, the job management application 411 obtains information concerning next print data.

After steps S505 and S507, the CPU 303 refers to the job management application 411 to determine the presence/absence of next print data in step S506. Upon determining that there is next print data, the CPU 303 repeats the processing from step S502. Upon determining that there is no next print data, the CPU 303 terminates the processing in FIG. 5.

Figure 6:
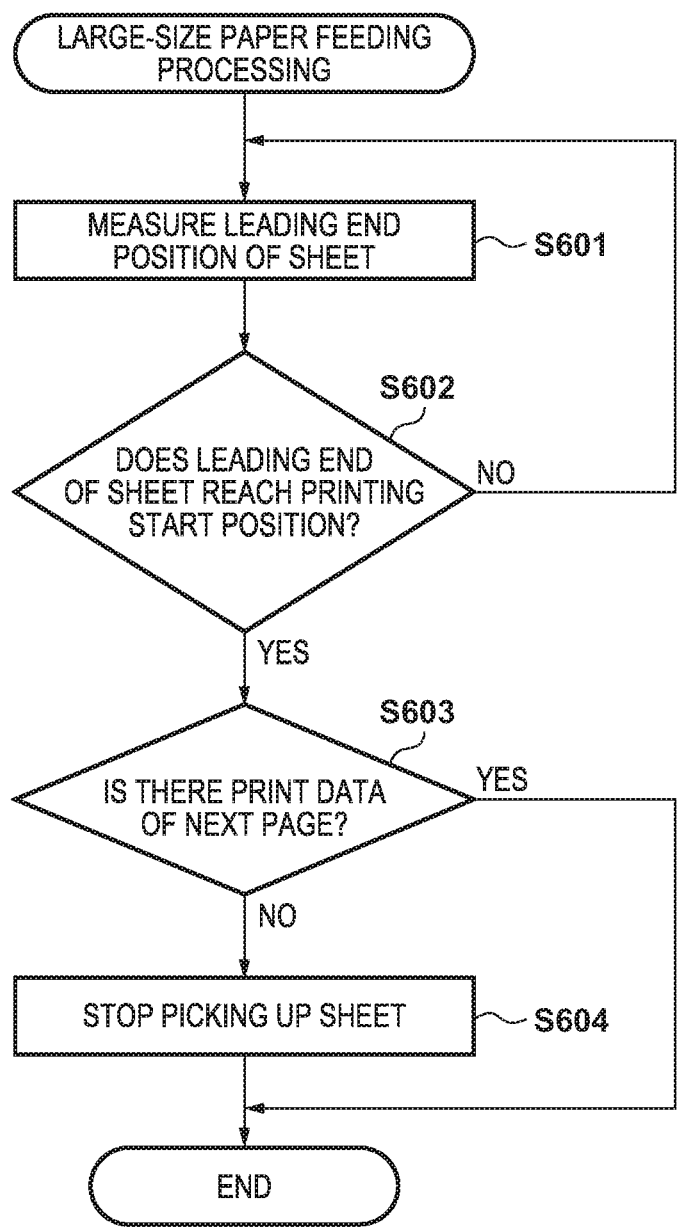
FIG. 6 is a flowchart showing processing in step S503.

FIG. 6 is a flowchart showing processing in step S503. After the start of paper feeding processing in step S501, the printing medium 201 is fed by the paper feeding roller 203 and conveyed through the first intermediate rollers 204 and the second intermediate rollers 205.

In step S601, when the leading end of the printing medium 201 reaches the paper detection sensor 208, the CPU 303 starts measuring the leading end position of the printing medium 201 based on the driving amount of the paper feeding motor 210.

In step S602, the CPU 303 determines whether the leading end position of the printing medium 201 has reached the conveying roller 206 and the pinch roller 207 at the printing start position. Upon determining that the leading end position has not reached the printing start position, the CPU 303 repeats the processing from step S601. Upon determining that the leading end position has reached the printing start position, the process advances to step S603.

In step S603, the CPU 303 refers to the information held by the job management application 411 to determine the presence/absence of the print data of the next page. The CPU 303 may determine the presence/absence of the print data of the next page by determining whether the paper sheet to be currently picked up is the last page. Upon determining that there is the print data of the next page, the CPU 303 terminates the processing in FIG. 6. The process then advances to step S504.

If the CPU 303 determines in step S603 that there is no print data of the next page, it is necessary to stop feeding the printing medium 201 from the paper feeding tray 202. Accordingly, in step S604, the CPU 303 reverses the rotating direction of the paper feeding motor 210 to stop the paper feeding operation of the paper feeding roller 203. In step S604, the position of the printing medium 201 coincides with the position of a printing medium 212 shown in FIG. 2, at which the printing medium 212 is nipped between the conveying roller 206 and the pinch roller 207. In this state, even if a delay occurs at the first intermediate rollers 204 and the second intermediate rollers 205 upon changing of the rotating direction of the paper feeding motor 210, the printing medium at the position of the printing medium 212 shown in FIG. 2 is pulled by the conveying roller 206 and the pinch roller 207 connected to the conveying motor 211. In this embodiment, the conveying force generated by the conveying roller 206 is larger than that generated by the first intermediate rollers 204 and the second intermediate rollers 205, and the paper sheet driving amount is managed by the conveying motor 211. This makes it possible to accurately manage the paper sheet position.

The determination in step S603 can minimize the number of times of changing the rotating direction of the paper feeding motor 210 and hence shorten the paper sheet interval accordingly. In addition, this can suppress a delay caused by backlash and hence improve the throughput. As a consequence, printing at an accurate paper sheet position can be implemented without being influenced by a delay caused at the first intermediate rollers 204 and the second intermediate rollers 205 by the changing of the rotating direction of the paper feeding motor 210. In addition, the throughput can be improved.

Figure 7:
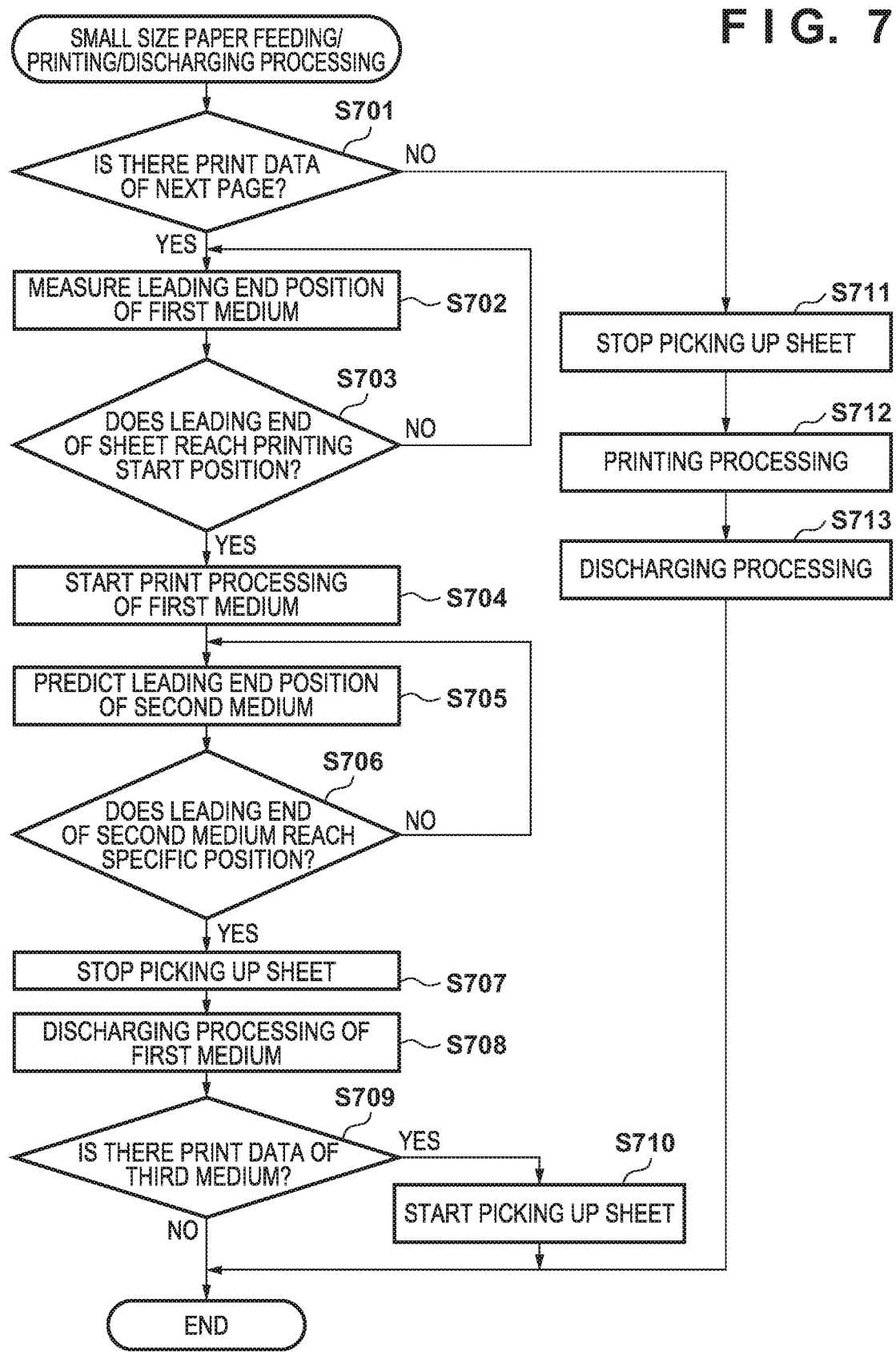
FIG. 7 is a flowchart showing processing in step S507.

FIG. 7 is a flowchart showing the processing in step S507. After the start of paper feeding processing in step S501, the printing medium 201 is fed by the paper feeding roller 203 and conveyed through the first intermediate rollers 204 and 205.

In step S701, the CPU 303 determines the presence/absence of the print data of a next page by referring to the information held by the job management application 411 before the printing medium 201 reaches the paper detection sensor 208. Upon determining that there is no print data of the next page, the CPU 303 stops the paper feeding operation of the paper feeding roller 203 by changing the rotating direction of the paper feeding motor 210 in step S711. After the stoppage of the paper feeding operation, the CPU 303 conveys the printing medium 201 on the conveying path to the printing start position in step S712. When the printing medium 201 reaches the printing start position, the CPU 303 controls the conveying motor 211 to rotate the conveying roller 206 and the discharging roller 209 and also scan the carriage 213, thereby performing printing. In step S713, after the printing processing, the CPU 303 controls the conveying motor 211 to rotate the conveying roller 206 and the discharging roller 209 so as to discharge the printing medium 201. Thereafter, the CPU 303 terminates the processing in FIG. 7.

Upon determining in step S701 that there is the print data of the next page, the CPU 303 measures the leading end position of a printing medium (to be referred to as the "first medium" hereinafter) currently located on the most downstream side on the conveying path by using the paper detection sensor 208 in step S702.

In step S703, the CPU 303 determines, based on the result obtained in step S702, whether the first medium has reached the printing start position. Upon determining that the first medium has reached the position, the CPU 303 starts printing on the first medium in step S704. At this time, the CPU 303 has started feeding a printing medium (to be referred to as the "second medium" hereinafter) located more upstream than the first medium. In this case, because the conveying motors 211 and 210 respectively convey the first and second media, it is possible to simultaneously perform printing and paper feeding.

In step S705, the CPU 303 predicts (specifies) the leading end position of the second medium based on the driving amounts of the paper feeding motor 210 and the conveying motor 211 by using the leading end position of the first medium in step S702. After the end of the picking-up of the first medium, the CPU 303 immediately and continuously starts feeding the second medium. The distance between the first and second media is determined by the arrangement of the printing apparatus 100. Accordingly, the position of the second medium is predicted based on the relative positions of the first and second media.

Figure 8:
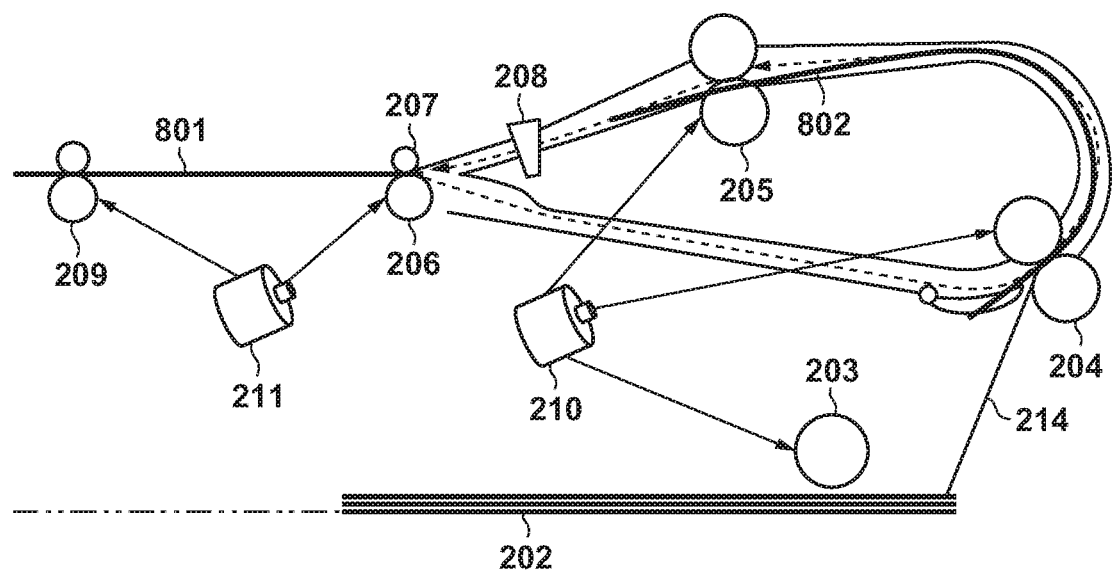
FIG. 8 is a view for explaining a positional relationship concerning a printing medium.

In step S706, the CPU 303 determines, based on the prediction result obtained in step S705, whether the second medium has reached a specific position. FIG. 8 shows the positional relationship between the printing media at this time. A printing medium 801 represents the first medium during printing. A printing medium 802 represents the second medium located upstream of the paper detection sensor 208. This positional relationship is decided by the arrangement of the printing apparatus 100.

As shown in FIG. 8, assume that when the rotating direction of the paper feeding motor 210 is changed while the leading end of the second medium is located upstream of the paper detection sensor 208 (at a specific position), a delay has occurred at the first intermediate rollers 204 and the second intermediate rollers 205. In this case, the specific position corresponds to a region located upstream of the paper detection sensor 208 and downstream of the second intermediate rollers 205. In this case as well, after a delay has occurred at the first intermediate rollers 204 and the second intermediate rollers 205, the second medium passes through the paper detection sensor 208, thereby allowing the paper sheet position management application 412 to recognize the positional relationship with the second medium again. This makes it possible to accurately manage the positions of paper sheets. In contrast, assume that the rotating direction of the paper feeding motor 210 is changed while the second medium is located downstream of the paper detection sensor 208, a delay has occurred at the first intermediate rollers 204 and the second intermediate rollers 205. In this case, a shift occurs between the actual paper sheet position and the paper sheet position recognized by the paper sheet position management application 412. In addition, when a printing medium is conveyed to the printing start position, a paper sheet that need not be fed may be picked up. Accordingly, in this embodiment, the CPU 303 determines in step S706 whether the second medium is located at a specific position on the upstream side of the paper detection sensor 208.

In step S707, after the second medium reaches the specific position, the CPU 303 stops the paper feeding operation of the paper feeding roller 203 by reversing the rotating direction of the paper feeding motor 210. At this time, the second medium is located upstream of the paper detection sensor 208. Accordingly, as described above, even if a delay has occurred at the first intermediate rollers 204 and the second intermediate rollers 205, letting the second medium pass through the paper detection sensor 208 can accurately manage the position of the second medium.

When printing on the first medium is completed upon changing of the rotating direction of the paper feeding motor 210, the CPU 303 starts discharging the first medium in step S708. In this case, the job management application 411 discards the print data of the first medium and obtains the print data of a paper sheet (to be referred to as the "third medium" hereinafter) next to the second medium. This is because the job management application 411 limits the amount of data that can be held in the RAM 304 to the print data corresponding to two pages.

In step S709, the CPU 303 refers to the information held by the job management application 411 to determine whether there is the print data of the third medium. Upon determining that there is no print data, the CPU 303 terminates the processing in FIG. 7. At this time, the rotating direction of the paper feeding motor 210 is a direction to stop the paper feeding operation of the paper feeding roller 203. With this arrangement, even if the print data that can be held by the job management application 411 is limited to a predetermined amount (for example, two pages), it is possible to perform paper feeding, printing, and discharge with respect to the second medium without picking up the third medium from the paper feeding tray 202.

Upon determining in step S709 that there is the print data of the third medium, the CPU 303 starts the paper feeding operation of the paper feeding roller 203 in step S710. In step S710, the CPU 303 changes the rotating direction of the paper feeding motor 210 to cause the paper feeding roller 203 to feed the third medium stacked on the paper feeding tray 202. The CPU 303 then terminates the processing in FIG. 7.

In the processing in FIG. 7, although the paper feeding direction is changed when needed, because the necessity/unnecessity of execution in FIG. 7 is controlled in accordance with the paper sheet size, it is possible to improve the throughput in terms of a printing operation as a whole.

As described above, according to this embodiment, paper sheet positions can be accurately managed without being influenced by a delay caused at the first intermediate rollers 204 and the second intermediate rollers 205 by the changing of the rotating direction of the paper feeding motor 210. This makes it possible to implement printing at an accurate paper sheet position and improve the throughput.

Second Embodiment

The first embodiment has exemplified the arrangement in which the amount of print data that can be held by the job management application 411 is limited to, for example, the amount corresponding to two pages. In the second embodiment, a job management application 411 is configured to be able to hold all the print data of print targets when, for example, a RAM 304 has a sufficient storage capacity. Different points from the first embodiment will be described below.

FIG. 9 is a flowchart showing the printing processing performed by a printing apparatus 100 according to this embodiment. A CPU 303 implements the processing in FIG. 9 by reading out programs stored in a ROM 305 into the RAM 304 and executing the programs. The printing apparatus 100 receives a printing operation instruction (job) from a host computer 314 via a USB I/F 309 or a network I/F 310. A printer control module 421 controls a printer unit 312 via an engine I/F 307 to start the processing in FIG. 9. Although this embodiment exemplifies a case in which a job is received from the host computer 314, the printing apparatus 100 may generate a job.

In step S901, upon receiving an instruction to execute a print job, the CPU 303 starts rotating a paper feeding motor 210 to feed a printing medium 201. At this time, the paper feeding motor 210 is controlled to rotate in a direction corresponding to a conveying direction 215 of the printing medium 201.

After the start of feeding of the printing medium 201, the CPU 303 starts large-size paper feeding processing in step S503 in FIG. 5 regardless of the paper sheet size in step S902. This large-size paper feeding processing is the same as the above processing in step S503 in the first embodiment, and hence a detailed description of the processing will be omitted. In this embodiment, the job management application 411 can grasp all the print data as print targets. Accordingly, it is possible to determine whether the paper sheet to be currently picked up is the last page even if the paper sheet length is short. For this reason, this printing apparatus need not be configured to determine the presence/absence of the print data of the third medium after discharging processing of the first medium as indicated in steps S708 and S709 in FIG. 7. In step S902, the CPU 303 changes the rotating direction of the paper feeding motor 210 while the printing medium 201 is nipped between a conveying roller 206 and a pinch roller 207. Accordingly, paper sheet positions can be accurately managed without being influenced by a delay caused at first intermediate rollers 204 and second intermediate rollers 205 by the changing of the rotating direction of the paper feeding motor 210.

In step S903, when the printing medium 201 reaches the printing start position, the CPU 303 drives the conveying motor 211 to rotate the conveying roller 206 and a discharging roller 209, and also scans a carriage 213, thereby performing printing. In step S904, after printing processing, the CPU 303 drives a conveying motor 211 to rotate the conveying roller 206 and the discharging roller 209, thereby discharging a printing medium 201.

In step S905 after the end of step S904, the CPU 303 refers to the information held by the job management application 411 to determine the presence/absence of the print data of the next page. Upon determining that there is the print data of the next page, the CPU 303 repeats the processing from step S902. In contrast, upon determining that there is no print data of the next page, the CPU 303 terminates the processing in FIG. 9.

As described above, according to this embodiment, because the CPU 303 grasps the timing of stopping a paper feeding operation for the printing medium 201, there is no need to perform the processing in step S507 in FIG. 5. As a consequence, it is possible to minimize a delay caused at the first intermediate rollers 204 and the second intermediate rollers 205 by the changing of the rotating direction of the paper feeding motor 210. This makes it possible to implement printing at an accurate paper sheet position and increase the printing speed by shortening the paper sheet interval.

The present invention is not limited to the above embodiments, and various changes and modifications can be made within the spirit and scope of the present invention. Therefore, to apprise the public of the scope of the present invention, the following claims are made.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-073083, filed on Apr. 5, 2019, which is hereby incorporated by reference herein in its entirety.

What is claimed is:

1. A printing apparatus comprising:
a feeding roller configured to feed a printing medium;
an intermediate roller configured to convey the printing medium fed by the feeding roller;
a conveying roller configured to convey the printing medium conveyed by the intermediate roller;
a printing unit configured to print on the printing medium conveyed by the conveying roller; and
a detection unit located between the conveying roller and the intermediate roller on a conveying path and configured to detect the printing medium,
wherein, in a case in which the printing unit prints on a first printing medium and a second printing medium subsequent to the first printing medium in succession,
if the second printing medium has a first size, feeding of the second printing medium by driving both of the feeding roller and the intermediate roller continues to be performed, subsequent to conveying of the first printing medium by driving of the conveying roller, until a leading end of the second printing medium reaches downstream of the detection unit, and
if the second printing medium has a second size smaller than the first size, feeding of the second printing medium by driving both of the feeding roller and the intermediate roller is stopped in a time period which is after a trailing end of the second printing medium passes the feeding roller and before the detection unit detects the leading end of the second printing medium, and the leading end of the second printing medium is conveyed downstream of the detection unit by driving of the intermediate roller after the first printing medium is discharged from the printing apparatus.

2. The apparatus according to claim 1, wherein feeding by driving of the feeding roller is stopped in response to a timing at which the first printing medium reaches the conveying roller, if the first printing medium has the first size and the second printing medium is not present.

3. The apparatus according to claim 1, wherein a length of a printing medium having the first size in a conveying direction is longer than a length of the conveying path, and a length of a printing medium having the second size in the conveying direction is shorter than the length of the conveying path.

4. The apparatus according to claim 1, wherein the printing unit is a printhead configured to print by discharging an ink droplet onto a printing medium.

5. The apparatus according to claim 4, wherein the conveying roller is controlled so as to convey a printing medium on the conveying path to a printing position of the printing unit in accordance with movement of the printhead in a scanning direction.

6. The apparatus according to claim 1, wherein, if the second printing medium has the second size and the printing unit prints on the second printing medium and a third printing medium subsequent to the second printing medium in succession, the detection unit detects a leading end of the second printing medium after feeding of the third printing medium by driving of the feeding roller is started.

7. The apparatus according to claim 6, wherein, if print data for the third printing medium exists after feeding by driving of the feeding roller is stopped, feeding of the third printing medium by driving of the feeding roller is started.

8. The apparatus according to claim 1, further comprising a first driving unit configured to drive the feeding roller and the intermediate roller, a second driving unit configured to drive the conveying roller, and a control unit configured to control driving of the first driving unit and the second driving unit.

9. The apparatus according to claim 8, wherein the control unit specifies a position of the second printing medium by using a position of the first printing medium having the second size, and stops, based on the specified position of the second printing medium, feeding driven by the first driving unit before detection of the second printing medium by the detection unit.

10. The apparatus according to claim 9, wherein the control unit specifies a position of the second printing medium based on driving amounts of the first driving unit and the second driving unit by using a distal end position of the first printing medium.

11. The apparatus according to claim 8, further comprising a holding unit configured to hold target data of a printing operation by the printing unit,
wherein the control unit stops feeding driven by the first driving unit if an amount of data held by the holding unit is limited to a predetermined amount and the printing media have the first size and the second size.

12. The apparatus according to claim 11, wherein the control unit stops feeding driven by the first driving unit in response to a timing at which the printing medium reaches the conveying roller, regardless of a size of the printing medium, if the amount of data held by the holding unit is not limited to the predetermined amount.

13. The apparatus according to claim 1, wherein a conveying force of the conveying roller is greater than a conveying force of the intermediate roller.

14. The apparatus according to claim 8, wherein the first driving unit includes a motor, and the control unit performs control to rotate the motor in a first rotating direction when the feeding roller is to feed the printing medium and to rotate the motor in a second rotating direction opposite to the first rotating direction when the feeding roller is to stop feeding.

15. The apparatus according to claim 1, wherein, if the second printing medium has the second size and a third printing medium subsequent to the second printing medium in succession is not present, driving of the feeding roller is stopped, while the second printing medium is conveyed by the intermediate roller, after the first printing medium is discharged from the printing apparatus.

16. A printing apparatus comprising:
a feeding roller configured to feed a printing medium;
a conveying roller configured to convey the printing medium fed by the feeding roller;
a printing unit configured to print on the printing medium conveyed by the conveying roller;
a control unit configured to control the feeding roller and the conveying roller; and
a detection unit located upstream of the conveying roller on a conveying path and configured to detect the printing medium,
wherein, in a case in which the printing unit prints on a first printing medium and a second printing medium subsequent to the first printing medium in succession, the control unit determines a feeding operation of the second printing medium based on a size of the second printing medium,
wherein, if the second printing medium has a first size, as the feeding operation of the second printing medium, feeding of the second printing medium by the feeding roller continues to be performed, subsequent to conveying of the first printing medium by the conveying roller, until a leading end of the second printing medium reaches downstream of the detection unit, and
if the second printing medium has a second size smaller than the first size, as the feeding operation of the second printing medium, feeding by the feeding roller and conveyance of the second printing medium are stopped in a time period which is after a trailing end of the second printing medium passes the feeding roller and before the detection unit detects the leading end of the second printing medium, and the leading end of the second printing medium is conveyed to downstream of the detection unit after the first printing medium is discharged from the printing apparatus.

17. The apparatus according to claim 16, wherein feeding by driving of the feeding roller is stopped in response to a timing at which the first printing medium reaches the conveying roller, if the first printing medium has the first size and the second printing medium is not present.

18. The apparatus according to claim 16, wherein a length of a printing medium having the first size in a conveying direction is longer than a length of the conveying path, and a length of a printing medium having the second size in the conveying direction is shorter than the length of the conveying path.

19. The apparatus according to claim 16, wherein, if the second printing medium has the second size and the printing unit prints on the second printing medium and a third printing medium subsequent to the second printing medium in succession, the detection unit detects a leading end of the second printing medium after feeding of the third printing medium by driving of the feeding roller is started.

20. The apparatus according to claim 16, wherein, if the second printing medium has the second size and a third printing medium subsequent to the second printing medium in succession is not present, driving of the feeding roller is stopped, while the second printing medium is conveyed, after the first printing medium is discharged from the printing apparatus.

21. The apparatus according to claim 16, further comprising a first driving unit configured to drive the feeding roller and a second driving unit configured to drive the conveying roller, and the control unit is configured to control driving of the first driving unit and the second driving unit.

22. The apparatus according to claim 21, further comprising a holding unit configured to hold target data of a printing operation by the printing unit,
wherein the control unit stops feeding driven by the first driving unit if an amount of data held by the holding unit is limited to a predetermined amount and the printing media have the first size and the second size.

23. The apparatus according to claim 21, wherein the first driving unit further drives an intermediate roller that is located between the feeding roller and the conveying roller on the conveying path and conveys the printing medium on the conveying path to the conveying roller.

* * * * *